(No Model.)
C. D. TISDALE.
ELECTRIC RAILWAY SYSTEM.
No. 518,293. Patented Apr. 17, 1894.
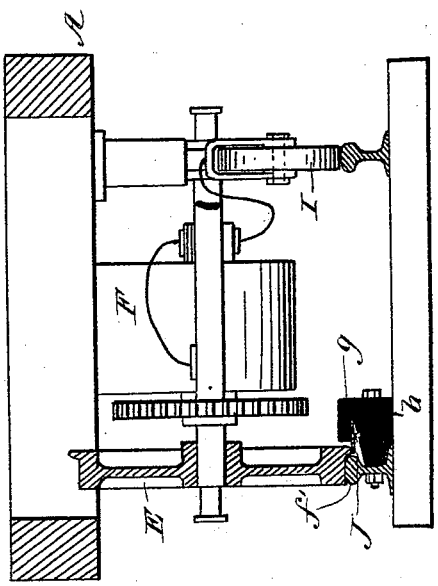
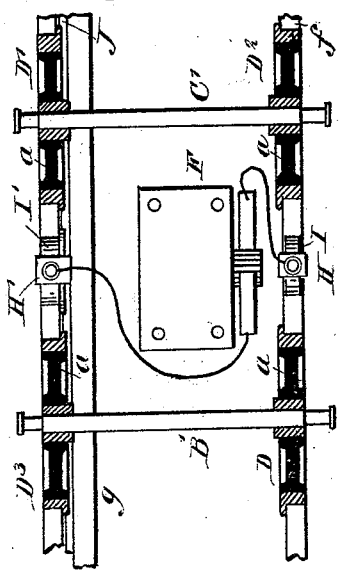
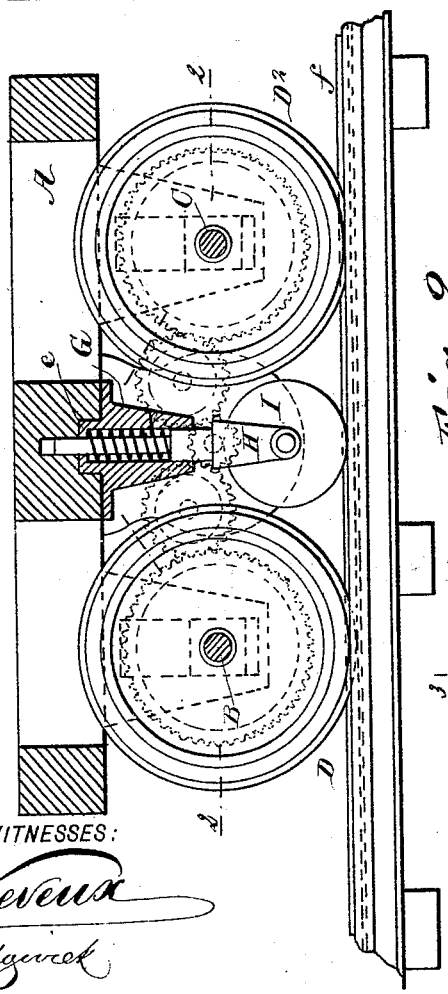
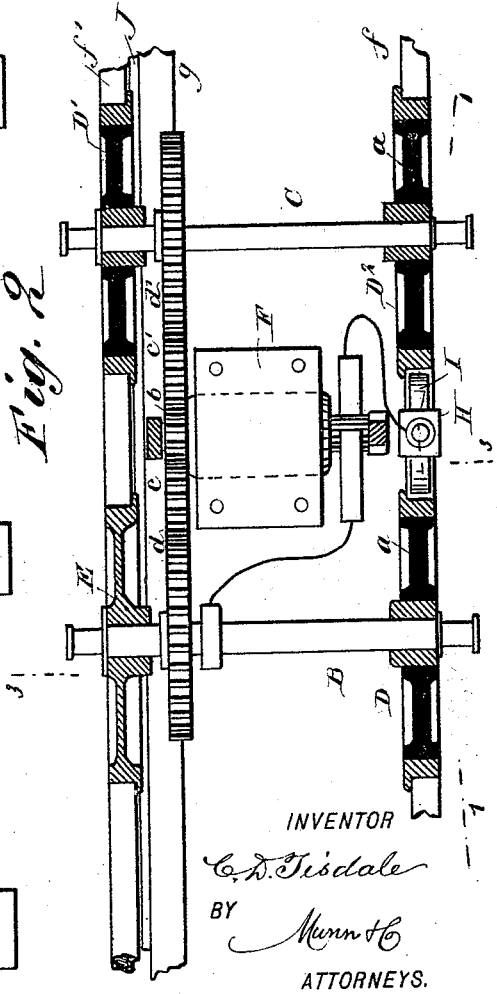
WITNESSES:
C. Neveux
C. Sedgwick
INVENTOR
C. D. Tisdale
BY
Munn & Co
ATTORNEYS.

UNITED STATES PATENT OFFICE.

CHARLES D. TISDALE, OF BOSTON, MASSACHUSETTS, ASSIGNOR, BY DIRECT AND MESNE ASSIGNMENTS, OF FIVE-SIXTHS TO JOHN D. GOULD, OF NEW YORK, N. Y., AND CHARLES HEALEY AND JAMES E. JENKINS, OF LYNN, MASSACHUSETTS.

ELECTRIC-RAILWAY SYSTEM.

SPECIFICATION forming part of Letters Patent No. 518,293, dated April 17, 1894.

Application filed April 26, 1893. Serial No. 471,892. (No model.)

*To all whom it may concern:*

Be it known that I, CHARLES D. TISDALE, of Boston, in the county of Suffolk and State of Massachusetts, have invented new and useful Improvements in Electric Railways, of which the following is a specification, reference being had to the annexed drawings, forming a part thereof, in which—

Figure 1 is a vertical longitudinal section of a car truck. Fig. 2 is a horizontal section taken on line 2—2 in Fig. 1. Fig. 3 is a vertical transverse section taken on line 3—3 in Fig. 2; and Fig. 4 is a horizontal section of a modified form.

Similar letters of reference indicate corresponding parts in all the views.

The object of my invention is to provide a simple and effective system of electric railways, in which both rails, or one rail and an auxiliary conductor, may be used for conveying the current for driving the cars.

My invention consists in a car truck provided with three or more insulated car wheels, and furnished with one or more auxiliary wheels for taking the current from one of the rails or conductors, and returning it to the other rail, all as will be hereinafter more fully described.

In the truck frame A, are journaled the car axles B, C, in the usual way. Upon the axle B, near one end, is placed one car wheel D, having an annular portion $a$ of insulating material such as paper, or vulcanized fiber, and on the other end of the axle is secured a metallic car wheel E. On the axle C are secured the insulated car wheels D', D², having the annular insulating portion $a$. The framework carries an electric motor F, upon the armature shaft of which is secured the pinion $b$. The said pinion transmits motion to the axles B, C, through the intermediate wheels $c, c'$ and the spur wheels, $d, d'$ secured to the axles. The truck frame A carries a socket G, in the present case located midway between the wheels D and D². To the said socket is fitted a forked rod H, which carries a contact wheel I, journaled between the arms of the fork. The portion of the rod H above the fork is squared and fitted to the square hole in the socket G. The smaller portion of the rod H extends through the upper end of the socket, and between the said upper end of the socket and the squared portion of the rod is placed a spiral spring $e$, which presses the forked rod downward and causes the wheel I, to form a good electrical contact with the rail $f$ upon which it rolls. The socket G is connected electrically with one of the brushes of the motor F, while the other brush is connected electrically with the axle B, either by means of a brush touching some portion of the axle, or by connection with the axle box. The truck runs upon the rails $f$, $f'$, and the current may be taken from the rail $f'$ through the motor F, thence to the contact wheel I, to the track rail $f$, but I prefer to use a conductor J, mounted in a piece of timber $g$, bolted to the rail $f'$. The conductor J consists of a strip of elastic material secured by one edge in a V-shaped slot $h$ in the timber $g$. The flange of the metallic wheel E makes an electrical contact with the elastic conductor J, and the conductor is protected by the timber $g$, so that to make an electrical connection with the said conductor by means other than the flange of the wheel, would be difficult.

In the modification illustrated in Fig. 4, the four car wheels D, D', D², D³, of the truck are mounted on the axles B' and C', and are each provided with an insulating portion $a$, as in the other case, and the current is taken from the conducting strip J by means of the flanged auxiliary wheel I', journaled in the forked rod H', the said forked rod being forced downward by a spring in the manner described in connection with the wheel I.

In the case of the device shown in Figs. 1, 2 and 3, the current passes through the conducting strip J, the metallic wheel E, the axle B, through one of the axle boxes of the said axle or a brush contacting with the axle, through the motor F, thence through the wheel I, and rail $f$. In the device shown in Fig. 4, the current flows from the conducting strip J through the flanged wheel I', the motor F, the wheel I and the rail $f$.

By means of my improved construction I avoid the necessity of using a trolley wire, and I provide main conductors on the ground level which are free from all danger of being crossed accidentally by vehicles or otherwise.

Having thus described my invention, I claim as new and desire to secure by Letters Patent—

1. In an electric railway system, the combination with a truck provided with three insulating wheels, two upon one side of the truck and one upon the other, of a motor mounted on the truck, and a trolley wheel arranged upon the side of the truck having two insulating wheels and arranged to form an electrical contact with the rail upon the side of the track supporting the two insulating wheels, substantially as specified.

2. In an electric railway system, the combination with the railway track, of a continuous longitudinally grooved timber, and a continuous elastic conducting strip inserted in the groove of the timber and lying in the path of the flange of the car wheel, the said elastic conducting strip being constructed for continuous contact with the car wheel, substantially as specified.

3. In an electric railway system, the combination of a track formed of the rails $f, f'$, the timber $g$ having a V-shaped groove, the elastic conductor J inserted in the groove, a truck provided with the metallic car wheel E and with the insulating car wheels D, D', $D^2$, the motor F mounted on the truck, and the spring-pressed contact wheel I, carried by the truck, substantially as specified.

CHARLES D. TISDALE.

Witnesses:
E. M. CLARK,
GEO. M. HOPKINS.